United States Patent [19]

Woerner et al.

[11] 3,903,126

[45] Sept. 2, 1975

[54] MANUFACTURE OF BIURET GROUP-CONTAINING POLYISOCYANATES

[75] Inventors: Frank P. Woerner, Mutterstadt; Heinz Pohlemann, Limburgerhof; Helmut Doerfel, Heidelberg; Georg Falkenstein, Neustadt, all of Germany

[73] Assignee: BASF Aktiengesellschaft, Ludwigshafen (Rhine), Germany

[22] Filed: Dec. 11, 1973

[21] Appl. No.: 423,715

[52] U.S. Cl. .................... 260/453 AB; 260/2.5 AT; 260/77.5 AT; 260/453 A; 260/453 AL; 260/453 AR
[51] Int. Cl. .......................................... C07c 119/04
[58] Field of Search ..... 260/453 AB, 453 P, 453 SP

[56] References Cited

UNITED STATES PATENTS

| 3,441,588 | 4/1969 | Wagner et al. ...................... 260/453 |
| 3,462,470 | 8/1969 | Emery et al. ....................... 260/453 |

*Primary Examiner*—Lewis Gotts
*Assistant Examiner*—Dolph H. Torrence
*Attorney, Agent, or Firm*—Johnston, Keil, Thompson & Shurtleff

[57] ABSTRACT

Biuret group-containing polyisocyanates are produced by reacting aliphatic and/or cycloaliphatic diamines with polyisocyanates.

6 Claims, No Drawings

MANUFACTURE OF BIURET GROUP-CONTAINING POLYISOCYANATES

This invention relates to a process for manufacture of biuret group-containing polyisocyanates from aliphatic and/or cycloaliphatic diamines and polyisocyanates.

It is known to manufacture biuret group-containing polyisocyanates from diisocyanates and water or water-eliminating compounds, hydrogen sulfide, formic acid, tertiary alcohols, mono-substituted ureas and N,N'-disubstituted ureas. In this method, amines are produced from the diisocyanates used via unstable intermediates, which amines react further with excess diisocyanate via urea group-containing polyisocyanates to give biuret group-containing polyisocyanates. The biuret group-containing polyisocyanates produced in this manner contain only structural elements derived from the diisocyanate used as starting component.

It has also been proposed to biuretize isocyanates by using amines and thus to introduce elements other than diisocyanate elements into the biuret group-containing polyisocyanate. The relevant literature, however, always stresses that only very specific amines, for example, W,W'-diamino polyethers having molecular weights of from 200 to 6,000, secondary monoamines, secondary diamines, dilute aromatic diamine solutions or aromatic diamines whose reactivity to isocyanates is reduced by steric or electronic influences, can be reacted with diisocyanates in a controllable reaction.

Polyisocyanates containing biuret groups are also produced by reacting monoamines with diisocyanates with elimination of the monoisocyanate corresponding to the monoamine.

This process suffers from the drawback that the reaction rate, particularly that of the reaction of hexamethylene diisocyanate with water, is relatively slow and by-products are formed, for example insoluble polyureas, which by-products may be separated from the biuret group-containing polyisocyanates only in a complicated and costly manner. A further disadvantage in all processes in which the diisocyanate is partially converted to the corresponding amine is the generation of carbon dioxide or the elimination of olefins or low-boiling monoisocyanates.

According to German Published Application No. 1,568,017, biuret group-containing polyisocyanates are obtained direct from aromatic diamines and diisocyanates, when the reaction is carried out in solvents boiling at a temperature below the boiling point of the isocyanate. The main drawback of this process is that the solvent has to be distilled off after the reaction. Direct reaction of the armoatic diamines specified in the Examples with the isocyanates given is not possible without the use of solvent, since the sparingly soluble polyureas which are formed immediately prevent any further reaction with diisocyanates.

We have now found, surprisingly, that aliphatic and cycloaliphatic diamines may also be reacted in a simple manner with polyisocyanates to give specific biuret group-containing polyisocyanates which are free of polyureas, which polyisocyanates may be used for example as starting material in the manufacture of light-fast paints and coatings having excellent mechanical properties.

Thus it is an object of the present invention to provide a process for the manufacture of stable polyisocyanates containing biuret groups, from diamines and polyisocyanates, which process is characterized in that aliphatic and/or cycloaliphatic diamines are reacted with polyisocyanates in such proportions as to give a ratio of $NH_2$ to NCO of from 1:3 to 1:100.

In our novel process we use aliphatic or, preferably, cycloaliphatic diamines. Examples of suitable diamines are aliphatic diamines of the formula:

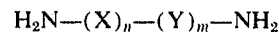

in which X and Y may be the same or different and each individually denotes a $-CH_2-$,

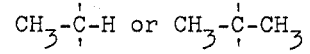

group, the groups X and Y possibly being attached to each other alternately in different segments or groups and in which n and m are integers of from 0 to 20, their total being at least 2.

Specific examples thereof are ethylene diamine, 1,2-propylene diamine, 1,3-propylene diamine and 1,4-diaminobutane. However, we prefer to use aliphatic diamines in which the amino groups are separated by a divalent aliphatic radical having at least 6 carbon atoms, preferably from 8 to 20 carbon atoms and more preferably from 8 to 13 carbon atoms, or the reactivity of which to isocyanates has been reduced by sterically hindering the amino groups. This is the case, for example, in the compounds 1,6-hexamethylene diamine, 1,8-diaminooctance, 1,10-diaminodecane and, preferably, 1,10-and 1,11-nonadecanodiamine. Suitable aliphatic diamines whose reactivity to isocyanates is reduced by steric hindering are 1-methyl-4-(aminoisopropyl)cyclohexylamine-1, 2,2,4-trimethyl-hexanodiamine-1,6and, preferably, 2,2-dimethyl-propanodiamine-1,3, 2,5-dimethylhexanodiamine-2,5 and 3-aminomethyl-3,5,5-trimethylcyclohexylamine-1.

We refer to use cycloaliphatic diamines having from 5 to 20 and preferably from 6 to 16 carbon atoms, such as 2-aminomethylcyclopentylamine-1, the diaminocyclohexanes such as 1,2- and 1,4-diaminocyclohexane, diaminodecalines such as 1,4-, 1,5- and 1,8-diaminodeclaine, tetrahydrodicyclopentadienylene diamine and tetrahydrotricyclopentadienylene diamine and analogous compounds, 1-methyl-4-aminoisopropylcyclohexylamine-1 and 3-aminomethyl-3,5,5-trimethylcyclohexylamine-1.

However, particularly suitable and preferred cycloaliphatic diamines are those of the formula:

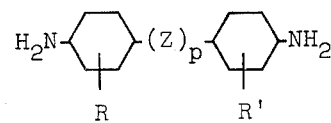

in which Z denotes a $-CH_2-$,

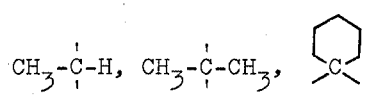

or $-CH_2-CH_2-$ group, p is 0 or 1 and R and R' may be the same or different and each individually denotes a hydrogen atom, a linear or branched alkyl radical of from 1 to 10 and preferably of from 1 to 4 carbon atoms, an alkyl ether radical of from 1 to 10 and preferably of 1 to 2 carbon atoms or a halogen atom such as fluorine, bromine and, preferably, chlorine.

Examples of suitable compounds are 4,4'-dicyclohexylamine, 3,3'-dimethyl-4,4'-diaminodicyclohexane, 3,3'-dimethoxy-4,4'-diaminodicyclohexane, 3,3'-dichloro-4,4'-diaminodicyclohexane, 1,1-bis-(4-aminocyclohexyl)ethane, 1,1-bis-(4-aminocyclohexyl)cyclohexane, 1,2-bis-(4-aminocyclohexyl)ethane and, preferably, 4,4'-diaminodicyclohexylmethane, 3,-3'-dimethyl-4,4'-diaminodicyclohexylmethane and 2,-2'-bis-(4-aminocyclohexyl)propane in the form of the cis-cis, cis-trans and/or trans-trans isomers and also mixtures of said isomers. Advantageously, use is made of a commercial 2,2-bis-(4-aminocyclohexyl)-propane isomer mixture containing the individual isomers in the following proportions: 60–70% w/w of trans-trans, 25–30% w/w of cis-trans and 5–15% w/w of cis-cis, based on the total weight of the isomer mixture.

The above diamines may be used individually or in the form of mixtures in any proportions. Alternatively, the diamines may be blended or diluted with mono-ols or polyols, particularly diols. Examples of suitable diamine mixtures are mixtures of: 3,3'-dimethyl-4,4'-diaminodicyclohexylmethane with nonadecanodiamine or with 4,4'-diaminodicyclohexylmethane or with hexamethylenediamine. Suitable diamine/polyol mixtures are for example mixtures of 3,3'-dimethyl-4,4'-diaminodicyclohexylmethane with 1,4-butanediol or with dipropylene glycol.

Particularly suitable polyisocyanates are aromatic and, preferably, aliphatic diisocyanates. Examples thereof are toluylene-2,4-diisocyanate, toluylene-2,6-diisocyanate and isomer mixtures thereof, 4,4'-, 4,2'- and/or 2,2'-diphenylmethane diisocyanate, the polyphenyl polymethylene polyisocyanates obtained by the condensation of aniline and formaldehyde followed by phosgenation, and xylylene diisocyanate. However, we prefer to use aliphatic and cycloaliphatic diisocyanates such as 4,4'-dicyclohexanodiisocyanate, 3-methylisocyanate-3,5,5-trimethylcyclohexylisocyanate-1,3,3'-dimethyl-4,4'-dicyclohexylmethanediisocyanate, bis-(4-cyclohexylisocyanate)methane, 1,2-bis-(4-cyclohexylisocyanate)ethane and, preferably, hexamethylenediisocyanate, cyclohexane-1,4-diisocyanate and 2,2,4-trimethylhexamethylenediisocyanate-1,6.

In the manufacture of the biuret group-containing polyisocyanates, the aliphatic and/or cycloaliphatic di-amines are reacted with the polyisocyanates in such proportions that the ratio of $NH_2$ to NCO is from 1:3 to 1:100 and preferably from 1:5 to 1:20 and more preferably from 1:6 to 1:16.

The reaction between the aliphatic and/or cycloaliphatic primary diamines proposed in the invention and the polyisocyanates is preferably carried out without the addition of solvents or diluents, although it is, of course, possible to operate in dilute solutions. In the latter case, the diamine is dissolved in an inert diluent and then incorporated in an excess of polyisocyanate. Suitable inert diluents are for example ethyl acetate, butyl acetate, ethyl glycol acetate, chloroform, carbon tetrachloride, tetrachloroethane, monochlorobenzene and the various dichlorobenzenes, benzene, toluene, xylene, diisopropyl ether, dibutyl ether, tetrahydrofuran and ethylene glycol dimethyl ether. However, the drawback of this technique is that the inert diluent used has to be removed from the resulting biuret group-containing polyisocyanates by fractional distillation after completion of the reaction.

The manufacture of the biuret-containing polyisocyanates may be carried out continuously or, preferably, batchwise.

Specifically, the biuret-containing polyisocyanates are conveniently manufactured as follows. The aliphatic and/or cycloaliphatic primary diamine is incorporated in an excess of diisocyanate of preferably from 5 to 20 moles per mole of diamine with vigorous agitation over from 10 seconds to 120 minutes and preferably from 3 to 60 minutes at elevated temperature and preferably at temperatures of from about 10° to about 60°C. Alternatively, the diamine may be added, over from 3 to 120 minutes and preferably from 5 to 90 minutes, to the diisocyanate heated at approximately 100° to 220°C and preferably at 160° to 190°C. It is possible, if desired, to stirr the diisocyanate into the diamine. To complete the reaction, the reaction mixture is then stirred at temperatures of from about 100° to about 220°C and preferably from about 140° to about 180°C for from 0.25 to 20 hours and preferably from 0.5 to 15 hours. The excess diisocyanate is separated by distilling the clear reaction mixture batchwise or continuously and conveniently under reduced pressure and, if desired, with the aid of a falling film evaporator. In some cases it is advantageous to remove the last residues of diisocyanate, for example hexamethylene diisocyanate, with the aid of entraining agents. There are obtained clear yellowish biuret-containing polyisocyanates of a sirupy consistency and mainly containing compounds of the formula:

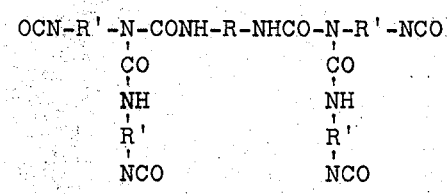

in which R' denotes a divalent aromatic, aliphatic and/or cycloaliphatic radical and R denotes a divalent aliphatic or cyclialiphatic radical.

The biuret-containing polyisocyanates produced in the process of the present invention are extremely thermostable, are suitable, particularly when aliphatic and/or cycloaliphatic diisocyanates have been used as starting components, for the manufacture of light fast paints and coatings, or which the mechanical properties may be varied as desired depending on the type of diamine used. The products may also be used in the manufacture of polyurethane foams and elastomers.

In the following Examples the parts are by weight.

EXAMPLE 1

To 168 parts (1 mole) of hexamethylene diisocyanate there are added, dropwise, with stirring at room temperature under a blanket of nitrogen, 29.8 parts (0.125 mole) of 3,3'-dimethyl-4,4'-diaminodicyclohexylmethane over 5 minutes. The pasty reaction mixture is then stirred for 7 hours at 140°C. The excess hexamethylene diisocyanate is then distilled from the clear reaction solution at 150°C/0.5 mm. There are obtained 105 parts of a yellowish biuretcontain-polyisocyanate having an NCO content of 19.9% by weight.

EXAMPLE 2

To 168 parts (1 mole) of hexamethylene diisocyanate there are added dropwise, with stirring at 180°C, 29.8 parts (0.125 mole) of 3,3'-dimethyl-4,4'-diaminodicyclohexylmethane over 5 minutes. The reaction mixture clarifies on stirring for 5 minutes at 180°C. To complete the reaction, the mixture is stirred for a further 20 minutes at 140°C, whereupon the excess hexamethylene diisocyanate is distilled off at 150°C/0.5 mm. There are obtained 120 parts of a biuret-containing polyisocyanate having an NCO content of 20.8% by weight.

EXAMPLE 3

To 840 parts (5 moles) of hexamethylene diisocyanate there are added dropwise, with stirring at approximately 20°C under a blanket of nitrogen, 74.5 parts (0.31 mole) of 3,3'-dimethyl-4,4'-diaminodiaminodicyclohexylmethane over 15 minutes. The reaction mixture is then stirred for 25 minutes at 180°C and then for 30 minutes at 140°C. Following distillation of the excess hexamethylene diisocyanate under reduced pressure there are obtained 550 parts of a clear viscous biuret-containing polyisocyanate having an NCO content of 19.5% by weight.

EXAMPLE 4

To 420 (2.5 moles) of hexamethylene diisocyanate there are added dropwise, with stirring under a blanket of nitrogen at 180°C, 65.75 parts (0.31 mole) of 4,4'-diaminodicyclohexylmethane heated at 70°C, over 20 minutes. The reaction mixture is then stirred for a further 10 minutes at 180°C and then for 30 minutes at 140°C. Following distillation of the excess hexamethylene diisocyanate under reduced pressure there are obtained 298 parts of a clear biuret-containing polyisocyanate having an NCO content of 21.4% by weight.

EXAMPLE 5

To 420 parts (2.5 moles) of hexamethylene diisocyanate there are added, with stirring under a blanket of nitrogen at 180°C, 74.5 parts (0.31 mole) of 2,2-bis-(4-aminocyclohexyl)propane over 15 minutes. The reaction mixture is then stirred for 25 minutes at 180°C and then for 30 minutes at 140°C. Following distillation of the excess hexamethylene diisocyanate there are obtained 270 parts of a clear biuret-containing polyisocyanate having an NCO content of 21.6% by weight.

EXAMPLE 6

To 168 parts (1 mole) of hexamethylene diisocyanate there are added, with stirring under a blanket of nitrogen at 30°C, 34.5 parts (0.12 mole) of nonadecanodiamine over 5 minutes. The reaction mixture is then heated to 140°C over 45 minutes and the clear solution is stirred for 1 hour at 140°C. Following distillation of the excess hexamethylene diisocyanate there are obtained 95 parts of a clear biuret-containing polyisocyanate having an NCO content of 17.9% by weight.

EXAMPLE 7

To 168 parts (1 mole) of hexamethylene diisocyanate there are added dropwise, with stirring under a blanket of nitrogen at 180°C, 18 parts (0.125 mole) of 2,5-dimethylhexanodiamine-2,5 over 10 minutes. The reaction mixture is then stirred for 20 minutes at 180°C and for 30 minutes at 140°C. Following distillation of the excess hexamethylene diisocyanate under reduced pressure, there are obtained 102 parts of a clear, highly viscous biuret-containing polyisocyanate having an NCO content of 18.4% by weight.

EXAMPLE 8

To 168 parts (1 mole) of hexamethylene diisocyanate there are added, with stirring under a blanket of nitrogen at 50°C, 21.2 parts (0.125 mole) of 1-methyl-4-(aminoisopropyl)cyclohexylamine-1 over 45 minutes. The waxy reaction mixture is stirred for 75 minutes at 180°C and then for 1 hour at 140°C. The excess diisocyanate is then distilled off under reduced pressure. There are obtained 100 parts of a clear biuret-containing polyisocyanate of a sirupy consistency and having an NCO content of 19.6% by weight.

EXAMPLE 9

To 168 (1 mole) of hexamethylene diisocyanate there are added, with stirring under a blanket of nitrogen at 170°C, 14 parts (0.23 mole) of 1,4-diaminocyclohexane over 8 minutes. The reaction mixture is stirred for 8 hours at 180°C and then for 30 minutes at 140°C. Following distillation of the excess hexamethylene diisocyanate there are obtained 108 parts of a clear biuret-containing polyisocyanate having an NCO content of 18.8% by weight.

EXAMPLE 10

To 168 parts (1 mole) of hexamethylene diisocyanate there are added, with stirring under a blanket of nitrogen at 180°C, 18 parts (0.125 mole) of 1,8-octanodiamine heated at 70°C, over 15 minutes. The pasty reaction mixture is stirred at 7.5 hours at 180°C and the resulting clear reaction solution is then stirred for 30 minutes at 140°C. Following distillation of the excess hexamethylene diisocyanate under reduced pressure, there are obtained 98 parts of a clear biuret-containing polyisocyanate having an NCO content of 20.1% by weight.

EXAMPLE 11

To 222 parts (1 mole) of 3-isocyanatomethyl-3,5,5-trimethylcyclohexylisocyanate-1 there are added, with stirring under a blanket of nitrogen at approximately 25°C, 29.8 parts (0.125 mole) of 3,3'-dimethyl-4,4'-diaminodicyclohexylmethane over 30 minutes. The pasty reaction mixture is stirred for 4 hours at 180°C and then for 30 minutes at 140°C. There are obtained 253 parts of a clear biuret-containing polyisocyanate having a sirupy consistency and an NCO content of 22.8% by weight.

EXAMPLE 12

To 174 parts (1 mole) of a 4:1 w/w mixture of 2,4- and 2,6-toluyldiisocyanate there are added, with stirring under a blanket of nitrogen at approximately 25°C, 29.8 parts (0.125 mole) of 3,3'-dimethyl-4,4'-diaminodicylohexylmethane over 10 minutes. The reaction mixture is stirred for 4 hours at 180°C. There are obtained 204 parts of a clear biuret-containing polyisocyanate having a sirupy consistency and an NCO content of 27.8% by weight.

EXAMPLE 13

To 168 parts (1 mole) of hexamethylene diisocyanate-1,6 there are added, with stirring under a blanket of nitrogen at approximately 25°C, 29.8 parts (0.125 mole) of 3,3'-dimethyl-4,4'-diaminodicyclohexylmethane over 1 minute. To complete the reaction, the reaction mixture is stirred for 1.75 hours at 165°C, whereupon the excess hexamethylene diisocyanate is distilled under reduced pressure. There are obtained 125 parts of a biuret-containing polyisocyanate having an NCO content of 20.4% by weight.

EXAMPLE 14

To 29.8 parts (0.125) mole of 3,3'-dimethyl-4,4'-diaminodicyclohexylmethane there are added, with stirring under a blanket of nitrogen at room temperature, 168 parts (1 mole) of hexamethylene diisocyanate over 20 seconds. The pasty reaction mixture is stirred for 2 hours at 165°C and then the clear reaction solution is evaporated under reduced pressure to remove the excess hexamethylene diisocyanate. There are obtained 110 parts of a biuret-containing polyisocyanate having an NCO content of 20.2% by weight.

EXAMPLE 15

To 105.2 parts (0.5 mole) of 2,2,4-trimethylhexamethylene diisocyanate there are added, with stirring under a blanket of nitrogen at approximately 25°C, 14.9 parts (0.0625 mole) of 3,3'-dimethyl4,4'-diaminodicyclohexylmethane over 30 minutes. The pasty reaction mixture is stirred for 8.5 hours at 165°C to complete the reaction. There are obtained 120 parts of a clear biuret-containing polyisocyanate solution having an NCO content of 24.2% by weight.

EXAMPLE 16

To 168 parts (1 mole) of hexamethylene diisocyanate 1,6 there are added, with stirring under a blanket of nitrogen at approx. 25°C, 14.5 parts (0.125 mole) of hexamethylene diamine heated at 70°C, over 20 minutes. To complete the reaction, the reaction mixture is stirred for 12 hours at 180°C. There are obtained 182 parts of a biuret-containing polyisocyanate having a sirupy consistency and an NCO content of 26.1% by weight.

EXAMPLE 17

To 168 parts (1 mole) of hexamethylene diisocyanate there are added, with stirring under a blanket of nitrogen at room temperature, 3.7 parts (0.05 mole) of 1,3-diaminopropane over 22 minutes. The reaction mixture is stirred for 5.5 hours at 180°C until is clarifies. There are obtained 172 parts of solution of biuret-containing polyisocyanate in hexamethylene diisocyanate, which polyisocyanate has an NCO content of 39.2% by weight.

EXAMPLE 18

To 420 parts (2.5 moles) of hexamethylene diisocyanate there are added, with stirring under a blanket of nitrogen at approx. 25°C, a mixture of 37.3 parts (0.157 mole) of 3,3'-dimethyl-4,4'-diaminocyclohexylmethane and 46.6 parts (0.157 mole) of nonadecanodiamine over approx. 10 minutes. The reaction temperature rises to about 80°C during this addition. To complete the reaction, the reaction mixture is heated to 165°C and stirred at this temperature for 1 hour. The excess hexamethylene diisocyanate is distilled from the clear reaction solution at 165°C and 0.5 mm of Hg. There are obtained 320 parts of a clear biuret-containing polyisocyanate having an NCO content of 19.7% by weight.

EXAMPLE 19

To 672 parts (4 moles) of hexamethylene diisocyanate there are added, with stirring under a blanket of nitrogen at approx. 25°C, 76.1 parts (0.32 mole) of 3,3'-dimethyl-4,4'-diaminodicyclohexylmethane and 10.7 parts (0.08 mole) of dipropylene glycol over approx. 10 minutes. To complete the reaction, the reaction mixture is heated to 165°C and stirred at this temperature for 110 minutes. The excess hexamethylene diisocyanate is distilled from the clear reaction solution with the aid of a falling film evaporator at 165°C and 1 mm of Hg. There are obtained 395 parts of a clear biuret-containing polyisocyanate having an NCO content of 20.9% by weight.

EXAMPLE 20

To 250 parts (1 mole) of 4,4'-diphenylmethane diisocyanate there are added, with stirring under a blanket of nitrogen at 80°C, 23.8 parts (0.1 mole) of 3,3'-dimethyl-4,4'-diaminodicyclohexylmethane over 10 minutes. To complete the reaction, the reaction mixture is heated to 170°C and stirred at that temperature for 5.5 hours. After cooling there are obtained 274 parts of a partially crystalline, pale yellow polyisocyanate mixture having an NCO content of 24.6% by weight.

EXAMPLE 21

To 150 parts of a mixture of crude polyphenyl polymethylene polyisocyanate there are added, with stirring under a blanket of nitrogen at room temperature, 9.5 parts (0.04 mole) of 3,3'-dimethyl-4,4'-diaminodicyclohexylmethane over 3 minutes. To complete the reaction, the reaction mixture is stirred for 6 hours at 140°C. After cooling, there are obtained 159 parts of a viscous, partially crystalline polyisocyanate mixture having an NCO content of 24.5% by weight.

We claim:

1. A process for the manufacture of stable polyisocyanates containing biuret groups which comprises reacting and heating at approximately 100°C. to 220°C. (I) a diamine selected from the group consisting of a. aliphatic diamines of the formula:

$$H_2N-(X)_n-(Y)_m-NH_2$$

in which X and Y may be the same or different and each individually denotes $-CH_2-$,

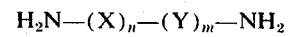

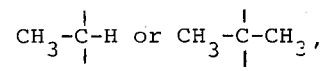

X and Y being attached to each other alternately or separately when representing different segments or groups and $n$ and $m$ being integers of from 0 to 20 with their total being at least 2, and b. cycloaliphatic diamines of the formula:

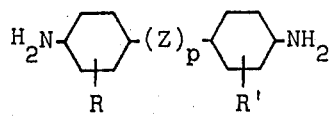

in which Z denotes —CH₂—,

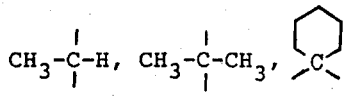

or —CH₂—CH₂—, $p$ is 0 or 1 and R and R' may be the same or different and each individually denotes hydrogen, a linear or branched alkyl of from 1 to 10 carbon atoms, alkyl ether of from 1 to 10 carbon atoms or halogen,
with (II) a polyisocyanate selected from the group consisting of aliphatic, cycloaliphatic and aromatic polyisocyanates and the polyphenyl polymethylene polyisocyanates obtained by the condensation of aniline and formaldehyde followed by phosgenation, in proportions of the diamine (I) to the polyisocyanate (II) such as to give a ratio of NH₂:NCO of from 1:3 to 1:100.

2. A process as claimed in claim 1 wherein the diamine (I) is selected from the group consisting of 4,4'-diaminodicyylohexylmethane, 3,3'-dimethyl-4,4'-diaminodicyclohexylmethane or 2,2-bis-(4-aminocyclohexyl)-propane in the form of the cis-cis, cis-trans or trans-trans isomers of a mixture of said isomers.

3. A process as claimed in claim 1 wherein the diamine (I) and polyisocyanate (II) are first reacted at about 10°C. to 60°C. and are then subsequently heated to said temperature of approximately 100°C. to 220°C.

4. A process as claimed in claim 1 wherein said ratio of NH₂:NCO is about 1:5 to 1:20.

5. A process as claimed in claim 1 wherein said ratio of NH₂:NCO is about 1:6 to 1:16.

6. A process as claimed in claim 1 carried out without any addition of solvents or diluents to the essential diamine and polyisocyanate reactants.

* * * * *